UNITED STATES PATENT OFFICE.

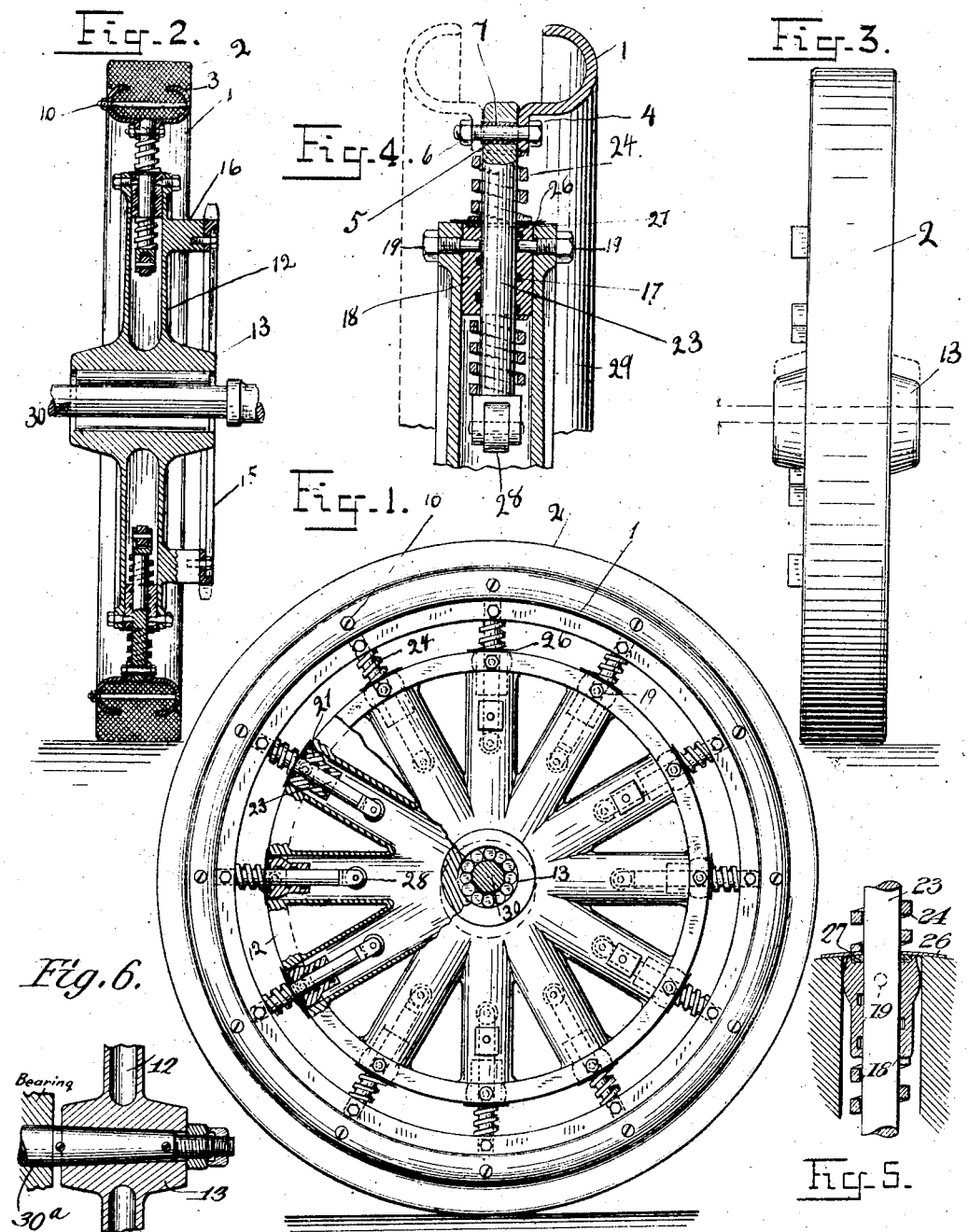

EDWARD F. MAYBAUM, OF NEW YORK, N. Y.

VEHICLE-WHEEL.

953,916.

Specification of Letters Patent.

Patented Apr. 5, 1910.

Application filed September 4, 1908. Serial No. 451,741.

*To all whom it may concern:*

Be it known that I, EDWARD F. MAYBAUM, a citizen of the United States of America, and a resident of the borough of Manhattan, city, county, and State of New York, have invented certain new and useful Improvements in Vehicle-Wheels, of which the following is a specification.

This invention relates to improvements in vehicle wheels, and especially to improvements in wheels of power-driven vehicles, such as automobiles, auto-trucks, and other power-driven vehicles.

It is the purpose of the invention to provide a resilient wheel, without pneumatic tires, but which will possess all the advantages of wheels with such tires without their serious and inherent disadvantage of liability to collapse through punctures, blow-outs, and a variety of other accidents. Such, indeed is the liability of pneumatic tires to failure from various causes, that it is a serious impediment and danger to the use of automobiles, and the tires are a constant source of expense. Thus far, however, no satisfactory substitute for pneumatic tires has been devised; and it is the purpose of this invention to provide such a substitute.

My invention also aims to provide great strength of construction, and security against undue "creeping" of the tires or rims, while also providing a great and satisfactory resiliency of the wheels, which insures smooth and comfortable running of the machine and the least practicable wear and tear of its parts.

Referring to the drawings, which accompany the specification to aid the description, Figure 1 is an elevation partly broken of a wheel equipped with the invention; Fig. 2 is a vertical cross section of a modification of the wheel, wherein the spokes are provided with two sets of springs; Fig. 3 is an edge or face elevation of the wheel; and Fig. 4 is an enlarged broken section and elevation of certain parts of the modification shown in Fig. 2; Fig. 5, is a detail on enlarged scale of the washer, spring plate, and adjacent parts; Fig. 6 is a sectional detail, on a large scale, of a modification wherein the wheel is fixed on the axle and the axle revolves in a bearing.

The wheel may turn upon its axle 30, any suitable ball bearing being provided, or it may be fixed upon said axle, and the axle may turn in suitable bearings. The hub 13 of said wheel is provided with any suitable number of hollow spoke bodies 12, which may be integral with said hub 13, or secured to said hub in any suitable manner, and said spoke bodies and hub will preferably be of metal possessing great tensile strength. The annular gear 15 is preferably bolted to lugs 16 of said spoke bodies. In the outer end of each said spoke body 12 is a radially perforated block 18, pivotally mounted in its spoke body so as to be capable of a slight but sufficient oscillation in the plane of rotation of the wheel; 19—19 being the pivot bolts of said block 18; and to better exclude dust I provide each block 18 with a boss 21 shaped on an arc of a circle struck from the center of oscillation of the spoke 23, and truly fitting its spoke body 12.

A groove 17 for a suitable spoke lubricant, as graphite, is also in each block 18. Through the bore of each block 18 works a radial spoke 23, normally pressed outwardly by a powerful spring 24, preferably arranged as shown with its outer end bearing on the flanges of the rim 1, and its inner end bearing on the centrally perforated closing spring plate 26. A dust-preventing annular washer 27, of leather or any suitable material, is held in place in the recessed end of each block 18 by said closing plate 26, and said spokes 23 work through said washers 27 with dust-tight fit. I prefer to place another powerful spring 29 on the inner part of each said spoke 23, arranged between the inner ends of said spokes and of said blocks 18 and so as to resist any tendency to move the said spokes 23 outwardly beyond normal position, the result of the action of both sets of said springs 24 and 27, being to give very perfect resiliency to the wheel—that is, to its rim and tire. The inner end of each said spoke 23 is provided with a roller 28 adapted to bear on the inner wall of its corresponding spoke body 12 when any slight deflection of the spoke occurs through tendency of the tire to creep, so as to prevent undue creeping of the tire and rim, while allowing of sufficient radial movement of said spoke 23 to insure the proper resiliency of the wheel. At their outer ends the said spokes 23 are each secured to the flanges 4 of the rims 1 by bolts 5 and jam nuts 6, bushings 7 properly distancing the said flanges 4—4, so as to prevent their unduly binding on the said spokes 23. The halves of said rim 1 are preferably curved, as seen in Figs. 2 and 4, and the curved outer edge of each said half of the rim enters an annular groove 3 of proper shape in the side of the solid tire 2, said tire being formed of rubber or of any other suitable material; cross-bolts 10, which extend through said tires and sides of the rim firmly holding the tire 2 in the rim and the parts of the rim together. By the aforesaid construction of the rim in two parts, with the tire and bolts as described, I provide for the ready removal and replacing of tires, and attain a construction of great strength and durability.

In operation, it will be understood that as the wheel runs over the ground, any jolting of the tire caused by roughness of the road or any other cause will be taken up by the resiliency of the wheel, which is insured by the spring-controlled radial movement of the spokes hereinbefore described, so that the vehicle runs with great smoothness and comfort to the occupants; while the combination of the strong hollow spoke-bodies 12 with the spokes 23 and the rollers 28 insures against any undue creeping of the tires, without diminishing the resiliency of the wheels.

It will of course be understood that the hub, spoke bodies and spokes may be constructed of any suitable material, and preferably of a metal having great tensile strength; that the rollers 28 may be of hard rubber or any other suitable material, the tires 2 of any rubber, rubber compositions or any other material suitable for tires, and generally that all parts of the wheel may be constructed of such materials as may be adapted to the particular use to which the wheel is to be put; and it will also be understood that various parts of the invention may be modified without departing from its essential features.

Now having described my improvements I claim as my invention—

1. In a vehicle wheel, the combination of a rim, a hub, hollow spoke bodies rigid thereon, spring-controlled spokes radially movable in said spoke bodies and connected at their outer ends to said rim, and rollers on said spokes adapted to bear against the walls of said spoke bodies to limit the deflection of said spokes, substantially as described.

2. In a vehicle wheel, the combination of a hub, hollow spoke bodies rigid thereon, guide blocks pivotally mounted in said spoke bodies, spokes radially movable in said blocks, and means on said spokes adapted to bear on the inner walls of said spoke bodies and limit the deflection of said spokes, substantially as described.

3. The combination in a vehicle wheel, of a rim and a tire, a hub, spoke bodies rigid thereon, blocks pivotally mounted in said spoke bodies, spring-controlled spokes radially movable in said blocks and connected at their outer ends to said rim, and rollers on the inner ends of said spokes adapted to bear against the walls of said spoke bodies and limit the creeping of the rim and the tire, substantially as described.

4. In a vehicle wheel, the combination with fixed spoke bodies and radially movable spokes of guide blocks for said spokes mounted in said spoke bodies and provided with dust preventing bosses, substantially as described.

5. The combination with the fixed spoke bodies and movable spokes of a vehicle wheel, of blocks through which said spokes work, dust preventing washers, and closing plates, substantially as described.

6. The combination in a vehicle wheel, of a hub, a rim and a tire, rigid spokes on said hub, radially movable spring-controlled spokes guided by said rigid spokes and pivotally connected at their outer ends to said rim, and having rollers on their inner ends adapted to limit the deflection of said radially movable spokes, substantially as described.

Signed at New York city this 3rd day of September 1908

EDWARD F. MAYBAUM.

Witnesses:
HENRY J. FINCK,
E. L. AHRENSDORF.